June 29, 1943.　　　F. T. CHRISTIAN　　　2,323,202
ENGINE CONTROL
Filed July 31, 1940
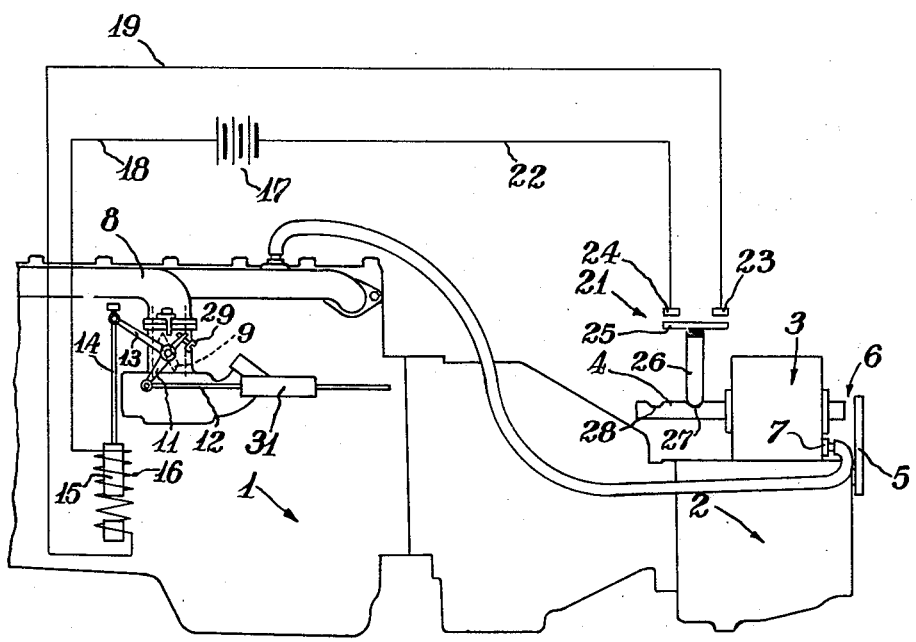
Witness:
Burr W. Jones
INVENTOR.
Frank T. Christian
BY Clinton S. Janes
ATTORNEY.

Patented June 29, 1943

2,323,202

UNITED STATES PATENT OFFICE 2,323,202

ENGINE CONTROL

Frank T. Christian, Elmira, N. Y., assignor to Bendix Aviation Corporation, South Bend, Ind., a corporation of Delaware Application July 31, 1940, Serial No. 348,800

2 Claims. (Cl. 74—472)

The present invention relates to an engine control and more particularly to a device for momentarily reducing the power output of an internal combustion engine in order to facilitate the shifting of variable speed gearing driven thereby.

In certain forms of automatic variable speed transmissions for internal combustion engines, the shifting of the gearing is facilitated if the load thereon is relieved during the shifting operation. One method of relieving the load is to reduce the power output of the engine, and it is an object of the present invention to provide a novel arrangement for performing this function as an incident to the actuation of the gear shift.

It is another object to provide such a device which does not render the engine inoperative nor affect its efficiency in any way.

It is a further object to provide such a device which is easily adjustable to vary the effect thereof on the engine.

It is another object to provide such a device, the operation of which is not affected by variations in the voltage of the power source.

It is another object to provide such a device which is simple in construction, economical to manufacture and not liable to get out of order.

Further objects and advantages will be apparent from the following description taken in connection with the accompanying drawing which illustrates semi-diagrammatically a preferred form of the invention.

In the drawing there is illustrated at 1 an internal combustion engine of conventional type adapted to drive a variable speed transmission 2. Automatic shifting means 3 for the transmission is provided including a shifting member 4 in the form of a slidable rail. A connection including an arm 5 is arranged to shift the transmission gears responsive to longitudinal movement of the shifting rail 4, said connection providing a certain amount of lost motion as indicated at 6 so as to permit initial movement of the shift rail 4 before it engages the connecting member 5.

The shifting means 3 is operated by power derived from the engine 1. As here shown, this is accomplished by providing a connection 7 between the shifting device and the intake manifold 8 of the engine so as to utilize the vacuum in the intake manifold to operate the shifting means. Since the shifting means and the transmission form no part of the present invention, further description thereof is deemed unnecessary.

According to the present invention, means are provided for reducing the power output of the engine responsive to initial movement of the shift rail 4. As here shown, this is accomplished by providing a valve 9 in the fuel intake of the engine, with means for closing the valve automatically when the shift rail starts to move. The valve 9 may be the throttle valve of the engine subject to the usual manual control for varying the power output of the engine, or may be an auxiliary throttling valve independently operable for the desired purpose.

As here shown, the valve 9 is the engine throttle valve which is operable by means of a crank arm 11 and link 12 from the accelerator pedal of the engine in the usual manner. For the purpose of automatic operation, a second crank arm 13 is provided which is connected by a link 14 to a solenoid plunger 15. A coil 16 is provided for operating the plunger 15, and is incorporated in a control circuit comprising battery 17, leads 18 and 19, rail switch 21 and lead 22. Switch 21 comprises a pair of fixed contacts 23 and 24 and a bridging contact 25 carried by a slidable plunger 26, the lower end of which is rounded and arranged to engage in one or the other of notches 27, 28 in the shift rail 4. It will be understood that the particular type of switch used is unimportant, so long as the contacts are adapted to be closed by the initial movement of the shift rail and to open when the shifting movement of the rail is completed.

The degree of closure of the valve 9 is preferably so regulated as to permit just sufficient fuel mixture to pass the valve to maintain the engine in idling condition. Any form of adjusting means such as illustrated at 29 may be used for this purpose.

Inasmuch as the operator may not release the manual control of the throttle when the transmission is shifted, a yielding connection 31 is preferably provided in the link 12, which connection is arranged to compress upon overload thereof and permit the valve 9 to be closed by the solenoid 16 irrespective of the position of the accelerator pedal.

In operation, assuming the parts in the positions illustrated with the engine in operation driving the transmission, when a condition is encountered which demands that the transmission be shifted to another gear ratio, the shift rail 4 is moved to the right by intake vacuum under the gear shift controlling mechanism, not illustrated. Initial movement of the shift rail 4 causes closure of switch 21, whereupon solenoid 16 is energized to close the valve 9. The torque of the engine is thus removed from the transmission, and further movement of the shift rail 4 causes it to engage with the connecting member 5 and effect the shifting operation. As soon as the shift is completed, the plunger 26 of switch 21 falls into notch 28, thus opening switch 21 and deenergizing solenoid 16, whereupon throttle valve 9 is once more placed under control of the manual operating connection 12.

Although but one embodiment of the invention has been shown and described in detail, it will be understood that other embodiments are possible and various changes may be made in the design and arrangement of the parts without departing from the spirit of the invention as defined in the claims appended hereto.

What is claimed is:

1. In combination with an internal combustion engine including a throttle valve, manually operable means for opening the throttle including a connection adapted to yield on overload, a variable speed transmission driven by the engine, means operated by intake vacuum of the engine for shifting the transmission, said shifting means including a slidable rail and a connecting member having a lost motion connection, and means responsive to initial movement of the slidable rail for moving the throttle valve toward closed position with a force sufficient to overcome said yielding connection prior to engagement of said rail with the connecting member.

2. In combination with an internal combustion engine and a variable speed transmission driven thereby, a slidable rail, means for moving said rail, a lost motion connection between the rail and transmission including a connecting member for shifting the transmission, a throttle valve for the engine, electro-magnetic means for closing the throttle valve, a switch for energizing the electro-magnetic means, and means actuated by initial movement of the slidable rail for closing the switch prior to engagement of the connecting member and for opening the switch by final movement of said rail after the shifting operation is completed.

FRANK T. CHRISTIAN.